(No Model.)

A. H. OVERMAN.
VEHICLE WHEEL.

No. 446,692. Patented Feb. 17, 1891.

Witnesses
J. N. Shumway
L. D. Kelsey

Albert H. Overman
Inventor
By Atty
Earle Seymour

UNITED STATES PATENT OFFICE.

ALBERT H. OVERMAN, OF SPRINGFIELD, MASSACHUSETTS, ASSIGNOR TO THE OVERMAN WHEEL COMPANY, OF HARTFORD, CONNECTICUT.

VEHICLE-WHEEL.

SPECIFICATION forming part of Letters Patent No. 446,692, dated February 17, 1891.

Application filed November 17, 1890. Serial No. 371,661. (No model.)

*To all whom it may concern:*

Be it known that I, ALBERT H. OVERMAN, of Springfield, in the county of Hampden and State of Massachusetts, have invented a new Improvement in Vehicle-Wheels; and I do hereby declare the following, when taken in connection with accompanying drawings and the letters of reference marked thereon, to be a full, clear, and exact description of the same, and which said drawings constitute part of this specification, and represent, in—

Figure 1:
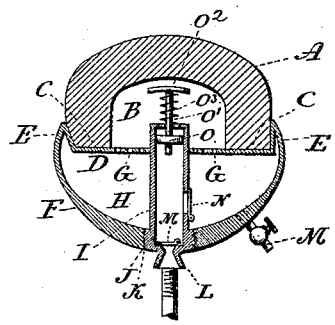
Figure 2:
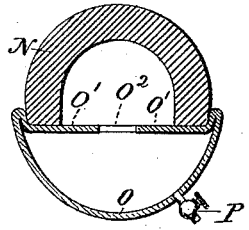

Figure 1, a view in transverse section of one form which a tire and rim embodying my invention may assume, and Fig. 2 a similar view of another form thereof.

My invention relates to an improvement in rubber tires for vehicle-wheels, the object being to produce a compact tire adapted to be used with or without an interior cushion of compressed air, so that in case the means of securing such a cushion are not convenient or become inoperative, or in case the tire is punctured, it may still be ridden with comfort.

With these ends in view my invention consists in the combination, with a rubber tire having a continuous interior open space, of a hollow rim communicating with such space and forming an auxiliary air-chamber.

My invention further consists in the combination, with a rubber tire having an interior air-space, of a hollow rim communicating with such space and forming an auxiliary air-chamber and an automatic air-pump mounted in the rim for pumping air into the rim and the tire.

My invention further consists in certain details of construction and combinations of parts, as will be hereinafter described, and pointed out in the claims.

As herein shown, the rubber tire A is arch-shaped in cross-section, of substantially uniform thickness, and has its sides adapted to take an edgewise bearing substantially in the plane of the wheel, the said sides being parallel and the tire inclosing an unoccupied interior space B of large dimensions relative to its entire size. The bases C of the said tire are made square and set upon the opposite edges of the rim-tread D, which is depressed below the retaining-flanges E E of the hollow rim F, the said tread virtually forming two annular seats extending transversely under the sides of the tire and being provided with openings G, which lead into the air-space B, whereby the said space and the chamber H, inclosed by the hollow rim, are made to communicate with each other. The sides of the tire abut against the inner faces of the said retaining-flanges E, whereby the tire is held against lateral displacement, the tire being cemented or otherwise secured to the said flanges and to the tread of the rim and the rim being made air-tight, so that there shall be no escape of air from the air-space B or from the chamber H. The sides of the tire being parallel, and the weight of the wheel and of the rider being supported, therefore, in radial parallel lines, the crowning or middle portion of the tire is thereby permitted to be inwardly displaced, so as to form a virtually flat bearing-face, which constitutes a stable tread for the wheel to roll upon. The tire is made of sufficient thickness to support the weight of the rider and wheel without the use of compressed air, so that in case it should be punctured or there should be any leakage in its air-space or in the chamber of the rim, or in case it should be inconvenient to charge it with compressed air, the wheel will not become inoperative, but may be used to good effect. In case, however, it is desired to use the tire in connection with a cushion of compressed air I preferably locate one or more automatic air-pumps in the wheel-rim for automatically pumping air into the chamber thereof and into the air-space of the tire, so as to maintain the required pressure of air therein independent of the use of the air-pump which is ordinarily used to charge the tire from time to time.

The automatic air-pump may take a variety of forms; but as herein shown it consists of a tube or cylinder I, made of sufficient length to extend from the inner surface of the rim through the tread D thereof and into the air-space B of the tire, its outer end being enlarged and screw-threaded, as at J, to adapt it to be removably secured in a threaded hole K, formed for it in the inner face or edge of the rim. A funnel-shaped piece L, projecting from the enlarged inner end of the cylinder, leads to a valve M, opening inwardly and hinged within the cylinder, which is provided with another valve N, hinged to its outer surface and controlling an opening leading into the chamber H of the rim. The outer end of the cylinder is provided with a piston O, adjustably mounted on a threaded piston-rod O', projecting beyond the outer end of the cylinder and carrying an operating-plate O², which is located within the range of the crown of the tire when the same is inwardly displaced. A spiral spring O³, interposed between the said plate and the outer end of the tube, is provided for sustaining the plate, and hence the piston, in positions of normal readiness to be operated upon by the tire when inwardly depressed.

By making the piston-rod adjustable with reference to the piston, which is done, as herein shown, by threading the rod into the piston, the position of the operating-plate with respect to the inner face of the tire may be adjusted as desired, and this adjustment will regulate and determine the action of the pump.

It will be readily understood that when the pressure of the air confined in the air-space and in the chamber is reduced below the pressure which has been determined upon by the rider as the pressure which best suits his comfort or convenience the tire will be inwardly displaced, so as to strike the plate O² and force the piston inwardly into the tube, whereby the air contained in the same is compressed and forced into the chamber in the rim by the opening of the valve N, the valve M being at this time closed. This action will be repeated until the pressure of the confined air has been so much increased that it will prevent a sufficient inward displacement of the tire to strike the plate and compress the air in the tube or cylinder which takes air through the valve M, which is normally free to open, but held closed from within when the air within the tube is compressed. The valve N, on the other hand, is normally held closed by the pressure of the air confined in the chamber and air-space, and only opens when the pressure of the air within the tube exceeds the pressure of the air in the air space and chamber.

By utilizing the hollow rim as an auxiliary air-chamber I am enabled to secure the volume of compressed air required for the best results without employing a tire of exaggerated size, the same being not only clumsy, unstable, and unsightly, but also heavy, expensive, and liable to be rendered useless by a puncture. My improved wheel is therefore very compact, and, while having the advantages of a wheel provided with a large inflated tire, presents much the appearance of an ordinary wheel.

The construction shown by Fig. 2 of the drawings dispenses with the automatic air-pump, the communicating chambers of the tire N and rim O being filled with compressed air through a cock P, mounted in the rim and adapted to have an air-pump temporarily attached to it. In this construction also the rim is made of uniform thickness, and its tread O' provided with a large central opening O², connecting the chambers. Preferably I also provide the rim F with a cock M for the attachment of a manual air-pump, by means of which the rim and tire are given their initial charge of compressed air. My invention is therefore not limited to the use of a tire or rim constructed in the specific form herein shown, or to the particular form of air-passage herein represented, and I would therefore have it understood that I do not limit myself to the exact construction shown and described; but hold myself at liberty to make such alterations therein as fairly fall within the spirit and scope of my invention.

Having fully described my invention, what I claim as new, and desire to secure by Letters Patent, is—

1. The combination, with a rubber tire having a continuous interior air-space, of a hollow rim communicating with such space and forming an auxiliary air-chamber, substantially as specified.

2. The combination, with a rubber tire having an interior air-space, of a hollow rim communicating with such space, and an automatic air-pump mounted in the rim for pumping air into it and into the tire, substantially as described.

3. The combination, with an arch-shaped rubber tire, of a hollow rim having retaining-flanges and a perforated tread, and an automatic air-pump mounted in the rim for pumping air into it and the tire, substantially as described.

4. The combination, with an arch-shaped rubber tire, of a hollow rim having retaining-flanges and a perforated tread, an automatic air-pump mounted in the rim and consisting of a cylinder provided with inlet and outlet valves, and a piston arranged to be operated by the tire when the same is inwardly displaced, substantially as described.

5. The combination, with a rubber tire arch-shaped in cross-section and having a continuous interior air-space, of a hollow rim communicating with such space and forming an auxiliary air-chamber and constructed with two annular seats extending transversely under the sides of the tire which take an edgewise bearing upon them, substantially as set forth.

In testimony whereof I have signed this specification in the presence of two subscribing witnesses.

ALBERT H. OVERMAN.

Witnesses:
B. C. BREWSTER,
P. PICKERING.